Sept. 14, 1965  G. H. FERTIG ETAL  3,206,597
FLUID ANALYZER AND TRANSDUCER CIRCUIT THEREFOR
Filed Sept. 27, 1962  2 Sheets-Sheet 1
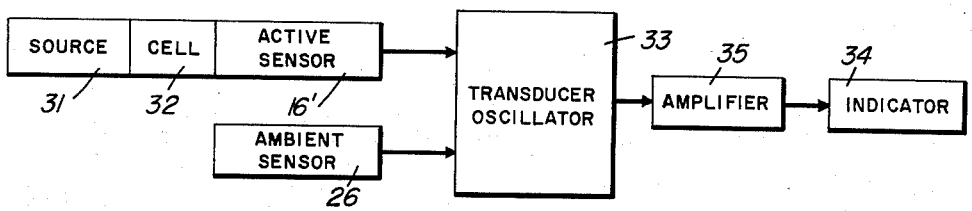
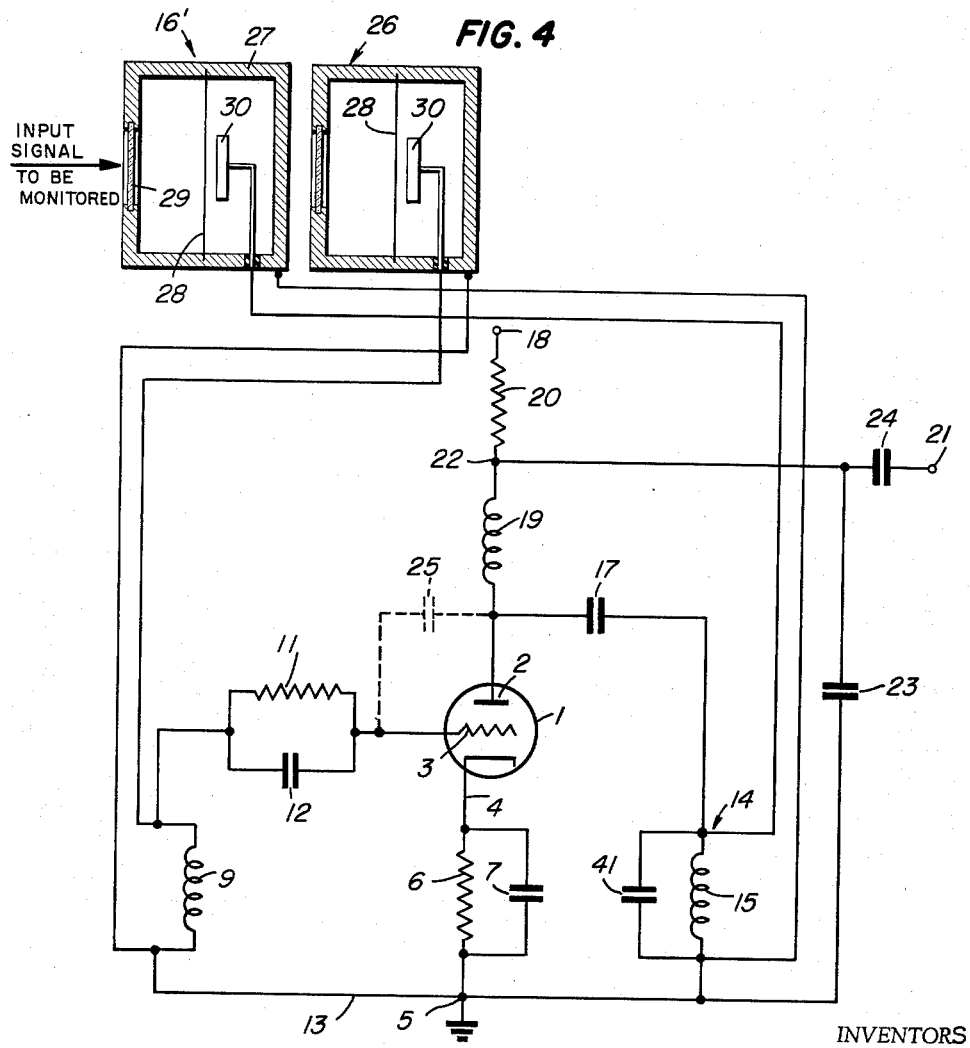
INVENTORS
GLENN H. FERTIG
BY ADRIAN C. BILLETDEAUX
*Rupert J. Brady*
ATTORNEY Sept. 14, 1965   G. H. FERTIG ETAL   3,206,597
FLUID ANALYZER AND TRANSDUCER CIRCUIT THEREFOR
Filed Sept. 27, 1962   2 Sheets-Sheet 2

INVENTORS
GLENN H. FERTIG.
ADRIAN C. BILLETDEAUX
BY
Rupert J. Brady
ATTORNEY

United States Patent Office 3,206,597
Patented Sept. 14, 1965

3,206,597
FLUID ANALYZER AND TRANSDUCER
CIRCUIT THEREFOR
Glenn Howard Fertig, Cheswick, and Adrian C. Billetdeaux, Pittsburgh, Pa., assignors to Mine Safety Appliances Company, Pittsburgh, Pa., a corporation of Pennsylvania
Filed Sept. 27, 1962, Ser. No. 226,643
10 Claims. (Cl. 250—43.5)

This invention relates broadly to an oscillator-transducer circuit and more particularly to an improved design of transducer circuit for converting low level signals from capacitance sensors or inductance sensors into voltage signals suitable for operation of electrical apparatus such as fluid analyzers, electrical controllers, or indicators, and which provide an improved method of analyzing fluids.

Prior electronic art has taught that the grid circuit of any electronic device is the more sensitive circuit and hence this portion of the circuit has always been utilized as the control portion since it was thought that this would provide the greatest sensitivity for the device. Amplifiers by their definition and construction teach that controlled variations in the grid circuit signal result in signals of greater magnitude in the plate circuit while the inverse is not true. Since an oscillator is a special form of amplifier, the natural place to insert a signal to use the oscillator as a transducer circuit is in the grid circuit. However, the disclosed oscillator-transducer circuit provides greater circuit sensitivity by placing the sensing or detecting element in the plate circuit. The exact theory of operation of the circuit and the manner in which the greater senstivity is obtained is not fully understood.

Therefore, the main object of the present invention is to provide a tuned grid-tuned plate oscillator-transducer circuit having greater sensitivity than similar type prior art transducer circuits.

Another object of the invention is to provide an improved transducer circuit having a sensor element connected in the plate circuit to render the circuit more sensitive than when the sensor is connected in the grid circuit.

In the prior art the common forms of fluid analyzers normally employ pneumatic type detectors or sensors having condenser microphones. A problem in the use of these devices is the undesirable responses thereof to ambient conditions such as vibration, shock, temperature, etc. which limits the useable sensitivity of this type of fluid analyzer and in many instances prevents their use in adverse environments, such as around heavy machinery, in mobile applications, etc. Others have attempted to solve the vibration and shock aspect of this problem, by merely connecting a compensating ambient sensor or condenser microphone in electrical parallel with the active sensor or condenser microphone but in mechanical opposed relation thereto. This parallel arrangement is connected to the same input of a transducer circuit. However, in this arrangement the compensating ambient sensor produces an electrical load on the active sensor, and since complete cancellation of ambient effects requires both sensors to be identical this results in reducing by half the analyzer sensitivity. This arrangement also has the further disadvantage that the sensors, due to their mechanical opposed disposition operate in electrical opposite modes, that is, as the output capacitance of one is increasing the output capacitance of the other is decreasing. Since it is difficult to obtain linear operation of identical sensors over a range this arrangement results in providing imperfect cancellation of the ambient effects.

These aspects of the problem which have plagued the fluid analyzer art for years have been eliminated by the fluid analyzer disclosed herein through the use of an improved transducer circuit, which provides opposing responses from a sensor connected in one input circuit, such as the grid circuit, and a sensor connected in another input circuit, such as the plate circuit, with both sensors arranged to respond in the same manner to ambient effects. This provides a differential action in the transducer circuit which permits rejection of the undesired ambient responses, such as vibration, shock and temperature, and yet full response to the desired signal sensed by the active sensor, since the ambient sensor does not provide an electrical load on the active sensor. The differential action of the transducer circuit also enables complete cancellation of the undesired ambient effects since both sensors respond in the same manner rather than opposed manner, to the ambient. That is, as the output capacitance of the active sensor is increasing the output capacitance of the ambient sensor is increasing, and vice versa. Thus the requirement of linear response of the sensors is eliminated.

Therefore, another object of the invention is to provide an improved construction of transducer circuit which serves to enhance the desired response and discriminate against undesired responses of the transducer.

A further object of the invention is to provide an improved transducer circuit which provides improved results from the reactance type sensors in environments of adverse vibration and shock, such as in mobile applications.

Another object of the invention is to provide improved fluid analysis apparatus having a novel transducer circuit which provides elimination of undesired ambient effects upon the sensors or detectors, particularly without reduction of overall analysis apparatus sensitivity.

Other and further objects of the invention reside in the improved method of fluid analysis provided with the transducer circuit and will become apparent by reference to the specification and drawings hereinafter following, in which:

FIG. 1 is a block diagram of a standard type fluid analyzer showing in block form the improved transducer circuit of the invention;

FIG. 4 is an electrical schematic diagram showing the transducer circuit of the invention with a reactance sensor in the tuned grid circuit and a reactance sensor in the tuned plate circuit.

Figure 3:
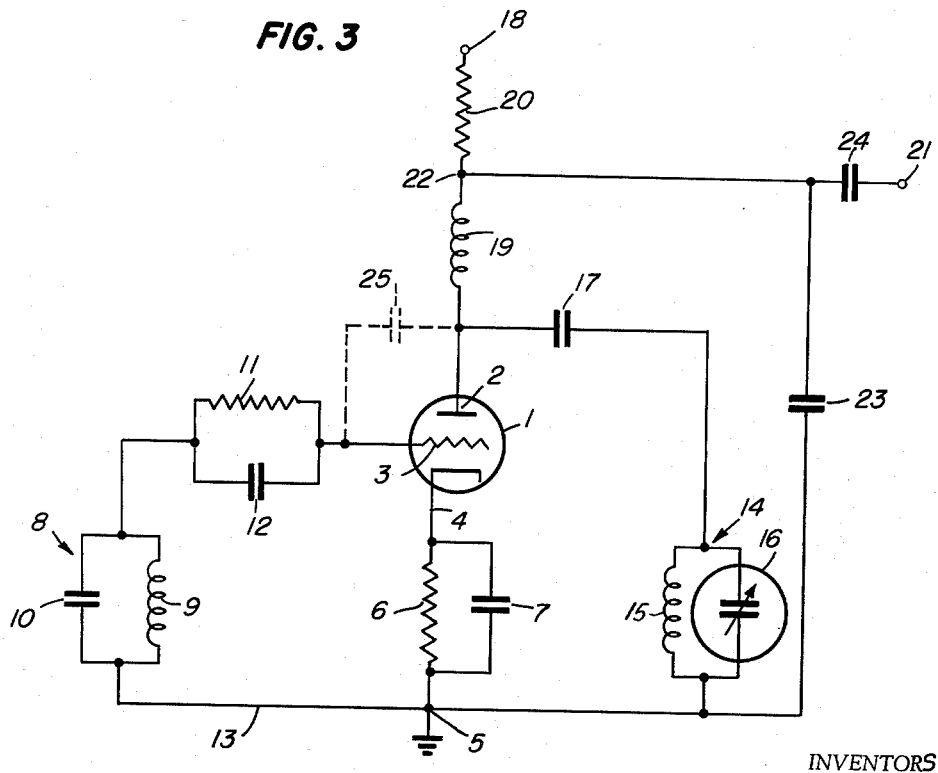
FIG. 3 is an electrical schematic diagram showing the transducer circuit of the invention with a sensor element in the tuned plate circuit.

Referring to the drawings in greater detail, FIG. 3 shows the transducer circuit in its simplest form. The circuit is comprised of an electron tube 1 having a plate 2, grid 3 and cathode 4, with the cathode 4 being connected to ground 5 through the self-biasing cathode circuit consisting of resistor 6 connected in parallel with bypass capacitor 7. A first tuned or resonant circuit indicated generally at 8, consisting of inductance 9 and capacitance 10 connected in parallel, has one end thereof connected to ground 5 through conductor 13, and the other end thereof connected to grid 3 through the parallel connection of resistor 11 and capacitance 12 which forms a self-bias grid circuit.

A second resonant circuit, indicated generally at 14, is provided in the plate circuit and consists of inductance 15 connected in parallel with reactance sensor 16, with one end of the resonant circuit connected to ground 5 and the opposite end of the circuit connected to plate 2 through coupling capacitor 17. The plate 2 is connected to a source of D.-C. potential indicated generally at 18 through a radio frequency choke 19 connected in series with resistor 20, with an output circuit 21 connected at 22 intermediate resistor 20 and choke 19, and a radio frequency bypass capacitor 23 connected intermediate circuit 21 and ground 5. The radio frequency choke 19 in combination with radio frequency bypass capacitor 23 forms a radio frequency filter to prevent radio frequencies generated within the circuit from appearing on output circuit 21. The output circuit is connected through coupling capacitor 24 to the following stages of the apparatus or device in which the circuit is utilized, such as the indicator, etc., of the fluid analyzers indicated in block form in FIGS. 1 and 2. The plate circuit is positive capacitatively coupled to the grid circuit through the inter-electrode grid-plate capacitance of electron tube 1 which is indicated in dotted lines at 25 connected intermediate plate 2 and grid 3.

The reactance sensor shown at 16 is of the capacitance type, such as a condenser microphone, but it is to be understood that the reactance sensor can also be of the inductance type in which case an inductance type reactance sensor would be substituted for inductor 15 and a fixed capacitor substituted for the capacitance type reactance sensor 16.

A modified form of the transducer circuit of the invention is shown in FIG. 4, wherein a reactance sensor 26 is included in the resonant circuit in the grid circuit as well as a reactance sensor 16' being included in the resonant circuit 14 of the plate circuit in the same manner as shown at 16 in FIG. 3. Both of the reactance sensors 26 and 16' in FIG. 4 have been shown as being of the capacitance type and are more particularly shown as being pneumatic detectors of the capacitance type. However, it is to be understood that the detector or sensor elements in the resonant circuits can be of the inductance type, in which case they would be substituted for inductors 9 and 15 and fixed capacitors would be substituted in lieu of the present capacitor type sensors shown. The sensors in each resonant circuit in each case should be identical and may be of any type capacitance or inductance sensor.

Each of the pneumatic detectors 26 and 16' comprises a sealed chamber 27 containing a light-absorbing gas and an electrically conductive flexible diaphragm 28 dividing the chamber, with one portion of the chamber having a light-transmitting window 29 for transmitting infra-red light, or the like, into the chamber, and an electrically conductive stator 30 placed in close proximity to said diaphragm and electrically insulated from chamber 27, thus forming a condenser microphone. In utiliizng the transducer circuit of FIG. 4, one of the sensors, such as sensor 16', is connected as an active sensor to respond to the effect or signal which is desired to be monitored, and the other sensor 26 is connected to respond only to the undesired ambient effects which also influence the active sensor 16'. Both the active and ambient sensors are physically arranged to respond in the same manner to the undesired ambient effects, such as vibration, shock and temperature. For example, the condenser microphone type sensors 16' and 26 shown in FIG. 4, which are sensitive to vibration and shock, should be arranged so that their diaphragms 28 are disposed in either the same plane or parallel planes with their stators 30 disposed on corresponding sides of the diaphragms so that both condenser microphones respond in identical manner to vibration and shock, that is, the output capacitance of both condenser microphones increase simultaneously and decrease simultaneously.

Figure 2:
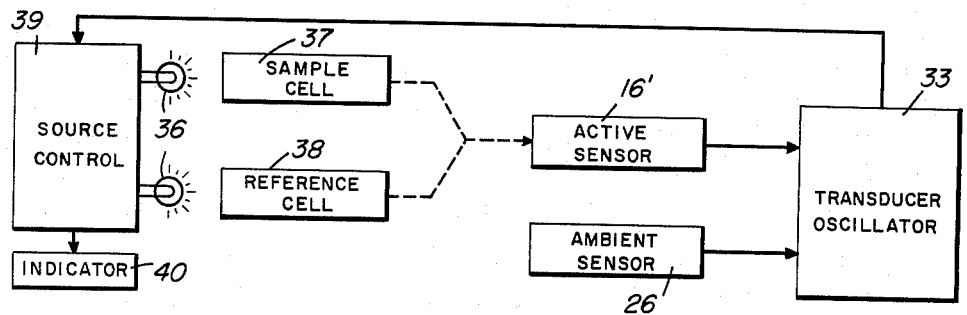
FIG. 2 is a schematic diagram in block form showing another form of fluid analyzer incorporating the improved circiut of the invention.

The transducer-oscillator circuit of FIG. 4 has been found to be particularly applicable to fluid analyzers wherein the method of analyzing the composition of the fluid is by means of the light absorption properties of the fluid, such as in analyzers of the infra-red type. The basic block diagram of such an analyzer which is well known in the art, but incorporating the transducer circuit of the invention is shown in FIG. 1. Such a fluid analyzer comprises a source of radiant energy 31 disposed to direct a beam of energy, such as infra-red light, through an absorption cell 32 containing a fluid, with the radiant energy transmitted therethrough sensed by an active sensor such as reactance sensor 16' included in the transducer-oscillator circuit of FIG. 4, indicated at 33. The ambient sensor 26 is disposed to respond only to the undesired ambient effects or signals which also affect active sensor 16'. The output of the transducer-oscillator 33 is then fed to an indicator 34, or the like, through an amplifying stage 35, to thus provide an indication of the composition of the fluid specimen in cell 32. In FIG. 2 the transducer-oscillator circuit of FIG. 4 has been shown applied to a comparison fluid analyzer of the type as shown and described in our co-pending application Serial No. 186,811, filed April 11, 1962, for Stabilized Comparison Analyzer and Method of Analyzing. The descriptive material of the detailed operation of this type of fluid analyzer is hereby incorporated herein by reference. In brief, radiant energy from sources 36 is intermittently transmitted through a sample absorption cell 37 and a reference absorption cell 38 with the difference in the radiant energy emerging from the cells being sensed by the active sensor 16' of transducer-oscillator circuit 33, such as disclosed in FIG. 4, which also includes the ambient sensor 26 which responds to the undesirable ambient conditions or signals which also effect active sensor 16'. The output of transducer-oscillator 33 is then fed back to source control 39 for adjusting the relative intensities of sources 36 with the indicator 40 connected in the same circuit to render an indication related to the composition of the fluid specimen in the sample cell. Rather than providing the source control 39 with a feed back signal from transducer circuit 33 as shown, the output of the transducer can be fed directly to an indicator or through an amplifier to an indicator as in the usual practice in double beam type radiant energy analysis appartus. Thus these block diagrams show the manner in which the teaching of the present invention can be effectively utilized in known designs of fluid analyzers to improve their scope of application.

The basic operation of the circuits of FIGS. 3 and 4 is substantially the same except that in the circuit of FIG. 4 a differential action is obtainable due to the use of a reactance sensor in the resonant grid circuit as well as in the resonant plate circuit. Similar components in the two circuits are indicated by similar reference numerals, and the following are typical values for the various circuit components which provide operation of the circuit in the described manner:

| | | |
|---|---|---|
| Capacitors and capacitance type sensors 10, 16, 16' and 26 | picofarads | 36 |
| Capacitor 41 | do | 3–15 |
| Capacitor 12 | do | 200 |
| Capacitor 7 | do | 9–18 |
| Capacitor 17 | do | 1000 |
| Capacitor 23 | microfarads | .047 |
| Capacitor 24 | do | .047 |
| Capacitance 25 | picofarads | 2 |
| Inductor 9 | $\mu$h | 23 |
| Inductor 15 | $\mu$h | 16–25 |
| Inductor 19 | Mh | 10 |
| Resistor 11 | | 12.5K |
| Resistor 20 | | 385K |
| Resistor 6 | | 12.5K |
| Tube 1 | | 12AX7 |

The resonant frequency of resonant circuit 14 in the plate is adjusted by means of inductor 15 to the place where most sensitive operation is obtained. By most sensitive operation it is meant that the largest change in voltage at point 22 or on output circuit 21, is obtained for the smallest change in capacity of sensor 16 or 16'. Generally, this adjustment will make the plate circuit resonant frequency lower than the grid circuit resonant frequency, although this is not necessarily the case. However, the resonant circuit of the plate and grid are always relatively detuned. Under these conditions an increase in the capacitance of ambient sensor 26 will produce a decrease in voltage at the junction 22 or on output circuit 21, and similarly a decrease in capacitance of ambient sensor 26 will produce an increase in voltage at 22 and on output circuit 21. With regard to the active sensor 16′ an increase in the capacitance thereof will produce an increase in voltage at junction 22 and on output circuit 21, and a decrease in the capacitance of active sensor 16′ will produce a decrease in voltage at junction 22 and on output circuit 21. This same type response holds true for sensor 16 in the circuit of FIG. 3. From the preceding description, it can be seen that the action of a reactance sensor of the capacitance type connected in the plate circuit is just the opposite of the action obtained from a reactance sensor of the capacitance type in the grid circuit. This same action is obtained when reactance sensors of the inductance type are used in place of the capacitance type sensors. The opposing responses thus obtained from the reactance ambient sensor 26 connected in the grid circuit versus the reactance active sensor 16′ connected in the plate circuit is the feature of the improved transducer circuit which permits rejection of the undesired ambient effects, such as vibration and shock, from the output 21, and yet provide full response to a desired signal such as in an infra-red analyzer, from one or the other of the capacitance sensors. The signals from the two sensors are thus differentially amplified with no loss in the over-all gain or sensitivity of the circuit since one sensor does not represent a load on the other sensor. The circuit does not change the sensitivity of the overall analysis apparatus in which it is used but provides for changing the sensitivity of the response of the ambient sensor to thus eliminate undesired ambient signals from output circuit 21.

It was observed in the development of this circuit that the transducer gain was greater when the active sensor was connected in the plate circuit, than it was when the sensor was connected in the grid circuit. This effect is not obvious to one experienced in the design of vacuum tube oscillator circuits, and it has been found that the fact that the circuit is more sensitive when the sensor is connected in the plate circuit may be utilized to great advantage. This permits electrical adjustment of the gain of the circuit to obtain identical response from sensors in either circuit. In general, it is much easier to adjust a circuit to balance, or identical response, than it is to actually impose very tight tolerances on the components so that the circuit has identical response.

In some instances it is necessary to reduce the sensitivity of the circuit to the sensor 16′ connected in the plate circuit and this reduction in sensitivity can be obtained by means of connecting a trimmer capacitor 41 in shunt across the sensor 16′ or across resonant circuit 14. The reduction in sensitivity can also be obtained by means of a resistor connected in shunt across the sensor, or a resistor connected in series with inductor 15. Another method which permits adjustment of the gain of the circuit with respect to the plate circuit sensor 16′ is to use a tap on inductor 15 for connecting resonant circuit 14 to the plate of the vacuum tube through coupling capacitor 17. When using an inductance type sensor in lieu of capacitance type sensor 16′ an inductor is used in lieu of trimmer capacitor 41 for reducing the sensitivity.

While the invention has been described in certain preferred embodiments it is realized that modifications can be made in the circuit and different applications for the circuit can be devised and it is to be understood that no limitations upon the invention are intended other than may be imposed by the scope of the appended claims.

What we claim as new and desire to secure by Letters Patent of the United States, is as follows:

1. An oscillation generator comprising oscillatory amplifier means having at least an anode, a cathode and a grid, a first resonant circuit connected to said grid, a second resonant circuit connected to said anode and having only positive capacitive coupling with said first resonant circuit, said resonant circuits being relatively detuned, a resistance connecting said cathode to a point of common reference potential, to ground, a capacitance connected in parallel with said resistance, a signal-responsive reactive element included in said second resonant circuit for sensing a desired signal and for varying the frequency thereof and the voltage at the anode, whereby greater sensitivity in the output voltage at the anode is obtained relative to signals received by said signal-responsive reactive element than when said element is connected in said first resonant circuit.

2. An oscillation generator comprising oscillatory amplifier means having at least a cathode, an input electrode and an output electrode, a first resonant circuit connected to said input electrode, a second resonant circuit connected to said output electrode and coupled only by means of said oscillatory amplifier means with said first resonant circuit, said oscillatory amplifier means having a resistor connecting said cathode to ground, a capacitance connected in parallel with said resistance, a signal-responsive reactive element included in said second resonant circuit for sensing a desired signal and for varying the frequency thereof, to thereby render greater voltage variations at said output electrode relative to variations in the signal sensed by said signal-responsive reactive element.

3. An oscillation generator as set forth in claim 2, in which the parallel connection of said capacitance and said resistor has a capacitive reactance in the range of 1000 to 10,000 ohms.

4. An oscillation generator comprising a vacuum tube having a cathode, a plate and a grid, a first resonant circuit connected to said grid and tuned to a first frequency, a second resonant circuit connected to said plate and having only positive capacitive coupling with said first resonant circuit and tuned to a second frequency close to said first frequency, output circuit means connected to said plate, a resistance connecting said cathode to a point of common reference potential, a capacitance connected across said resistance, and sensor means included in said second resonant circuit for varying the frequency thereof and producing greater variations in output voltage on said output circuit means relative to variations in signals received by said sensor means than obtainable when said sensor means is connected in said first resonant circuit.

5. An oscillation generator consisting of a vacuum tube having a cathode, a plate and a grid, a common reference potential circuit, a first resonant circuit, a resistance and capacitance in parallel connecting said first resonant circuit to said grid to provide a bias voltage proportional to grid current, a second resonant circuit coupled to said plate and having only positive capacitive coupling with said first resonant circuit, said resonant circuits being relatively detuned, a source of potential, a resistance connected in series between said source of potential and said plate, a cathode biasing circuit consisting of a resistance and capacitance in parallel connecting said cathode to said common reference potential circuit to provide a cathode bias voltage proportional to cathode current, and a signal-responsive reactive element included in said second resonant circuit for varying the frequency thereof and rendering greater voltage variations at said plate relative to variations in signals received by said signal-responsive reactive element.

6. An oscillator generator as set forth in claim 5, and a second signal-responsive reactive element included in said first resonant circuit and disposed to respond to undesirable ambient signals which also effect said first mentioned signal-responsive element, to eliminate undesirable ambient effects from the signal on said output circuit by differential amplification in said vacuum tube without loss of circuit gain.

7. An oscillation generator comprising oscillatory amplifier means having at least a cathode, an input electrode and an output electrode, a first resonant circuit connected to said input electrode, a second resonant circuit connected to said output electrode and having only positive capacitive coupling with said first resonant circuit, said resonant circuits being relatively detuned, a resistance connecting said cathode to ground, a capacitance connected in shunt across said resistance, an active signal-responsive reactive element included in said second resonant circuit for sensing a desired signal and varying the frequency of said resonant circuit to vary the voltage of said output electrode, and an ambient signal-responsive reactive element included in said first resonant circuit for varying the frequency thereof only in accordance with undesirable ambient effects to which said active reactive element also responds to vary the voltage at said output electrode, thereby to eliminate the effects of undesirable ambients upon said reactive elements from the voltage signal on said output electrode while maintaining the sensitivity of the circuit to responses of the active signal-responsive reactive element.

8. A comparison analyzer for rendering an indication of relative light absorption properties of fluid specimens comprising, light energy emitting means disposed to transmit a beam of light energy, cell means for containing light absorbing fluid in the path of the beam of light energy, first reactance sensor means disposed to receive and respond to the light energy emerging from said cell means, second reactance sensor means disposed to respond to undesirable ambient effects to which said first reactance sensor means also responds, oscillatory amplifier means having a plurality of electrodes including an input electrode and an output electrode, a first resonant circuit connected to said output electrode and including said first reactance sensor means for varying the frequency thereof, a second resonant circuit connected to said input electrode and including said second reactance sensor means for varying the frequency thereof, said resonant circuits being detuned and having only positive capacitive coupling with each other, a resistor connecting one of said plurality of electrodes to ground, a capacitance connected in parallel with said resistor, indicator means for rendering an indication of the light absorption properties of the fluid in said cell means, and an output circuit connecting said output electrode to said indicator means whereby analyzer sensitivity is maintained while the effects of undesirable ambients acting on said sensor means is eliminated from the signal on said output circuit.

9. A fluid analyzer of the type wherein the composition of a fluid is determined by means of the light absorption properties of the fluid comprising, first cell means for supporting a reference light absorbing fluid specimen, second cell means for supporting a sample light absorbing fluid specimen, means for intermittently directing light energy through said first and second cell means, first reactance sensor means connected in the path of light energy emerging from said cell means and disposed to respond thereto, second reactance sensor means disposed to respond to undesirable ambient effects to which said first reactance sensor means also responds, oscillatory amplifier means having a plurality of electrodes including an input electrode and an output electrode, a first resonant circuit connected to said output electrode and including said first sensor means, a second resonant circuit connected to said input electrode and including said second sensor means, said circuits being relatively detuned and having only positive capacitive coupling with each other, a resistance connecting one of said plurality of electrodes to ground, a capacitance connected in shunt with said resistance, indicator means and output circuit means connecting said output electrode to said indicator means to render an indication of the relative light absorption properties of the sample fluid specimen in said second cell means having the undesirable response of said sensors to undesirable ambient effects cancelled therefrom without loss of sensitivity in the analyzer response.

10. A fluid analyzer as set forth in claim 9, in which said reactance sensor means include condenser microphones, having electrically conductive movable diaphragms and fixed stators disposed in spatial relation therewith, the movable diaphragms of said first and second sensor means being relatively aligned, and the fixed stators thereof being disposed on corresponding sides of said diaphragms for substantially identical response therefrom to ambient effects.

References Cited by the Examiner
UNITED STATES PATENTS

| | | | |
|---|---|---|---|
| 2,473,556 | 6/49 | Wiley | 317—246 |
| 2,657,579 | 11/53 | Milson | 331—170 |
| 2,849,618 | 8/58 | Smith | 250—43.5 |
| 2,924,713 | 2/60 | Liston | 250—43.5 |

RALPH G. NILSON, *Primary Examiner.*